(12) United States Patent
Tiecher

(10) Patent No.: US 12,137,696 B2
(45) Date of Patent: Nov. 12, 2024

(54) SYSTEM FOR CLEANING FOWL GIBLETS

(71) Applicant: Mauro Tiecher, Chapecó (BR)

(72) Inventor: Mauro Tiecher, Chapecó (BR)

( * ) Notice: Subject to any disclaimer, the term of this patent is extended or adjusted under 35 U.S.C. 154(b) by 110 days.

(21) Appl. No.: 17/796,797

(22) PCT Filed: Dec. 27, 2020

(86) PCT No.: PCT/BR2020/050632
§ 371 (c)(1),
(2) Date: Aug. 1, 2022

(87) PCT Pub. No.: WO2022/027114
PCT Pub. Date: Feb. 10, 2022

(65) Prior Publication Data
US 2023/0047130 A1    Feb. 16, 2023

(30) Foreign Application Priority Data
Aug. 4, 2020    (BR) .................. 10 2020 015853 8

(51) Int. Cl.
*A22C 21/00*    (2006.01)
(52) U.S. Cl.
CPC ........................... *A22C 21/0061* (2013.01)
(58) Field of Classification Search
CPC .............. A22C 21/06; A22B 5/16; A22B 5/18
USPC ........................................................ 452/114
See application file for complete search history.

(56) References Cited

U.S. PATENT DOCUMENTS

| | | | | |
|---|---|---|---|---|
| 4,570,294 A | * | 2/1986 | Meyn ................. | A22B 5/18 452/114 |
| 4,590,643 A | * | 5/1986 | Hill .................... | A22C 17/14 198/626.1 |
| 4,608,732 A | * | 9/1986 | Hill .................... | A22B 5/18 452/114 |
| 5,098,336 A | * | 3/1992 | DeLong ............. | A22C 21/0092 452/130 |

FOREIGN PATENT DOCUMENTS

| | | |
|---|---|---|
| BR | 9502800 | 7/1996 |
| BR | 202015018345 | 2/2017 |
| BR | 202015021603 | 3/2017 |
| BR | 202017012153 | 12/2018 |
| BR | 202017016218 | 3/2019 |
| CN | 108669200 | 10/2018 |

OTHER PUBLICATIONS

International Search Report and Written Opinion of the International Searching Authority (translated) for PCT/2020/050632 dated Apr. 14, 2021.

\* cited by examiner

*Primary Examiner* — Richard T Price, Jr.
(74) *Attorney, Agent, or Firm* — B. Aaron Schulman, Esq.; Stites & Harbison, PLLC

(57) ABSTRACT

The present invention relates to a system (S) for conveying fowl giblets (not shown) that is installed in a machine (M) for processing fowl giblets (not shown) to clean said giblets (not shown). The system (S) includes a station (1) for guiding giblets (not shown) against a cleaning assembly (2), both of which are simultaneously moved by a movement assembly (4) so that the guide station (1) continuously shakes and presses the giblets (not shown) against the cleaning assembly (2), the movement of said station removing residual parts from the giblets (not shown) passing through the system (S).

10 Claims, 3 Drawing Sheets

SYSTEM FOR CLEANING FOWL GIBLETS

The present invention relates to a system for cleaning poultry giblets, particularly used to promote the cleaning of poultry giblets, such as gizzards, hearts and/or any of the alike from chickens, hens, turkeys or any other kind of poultry. This system is designed to provide directing flows for the movement of the giblets while cleaning them, in a manner that the movement occurs in different directions, resulting in a more efficient operation, in which the need of submitting these giblets to the cleaning operation once again can be avoided.

BACKGROUND OF THE INVENTION

Poultry giblets peeling apparatus used to clean the giblets are well known for those of ordinary skill in the art of poultry processing.

These apparatuses were developed to comply with safety standards, to avoid work accidents, as well as to reduce the need of manual labor during the selection and cleaning of giblets from slaughtered birds, which are widely marketed in the food industry worldwide. Thus, for such giblets to be marketed properly and with increased added value, after they are extracted from the carcasses of slaughtered birds, it is necessary to remove residual parts that come with the giblets.

Initially, the cleaning of giblets was performed manually by human labor, to clean each piece individually and resulting in low productivity, high rate of repetitive strain injuries (RSI), and work accidents.

Hence, automated apparatuses have been developed to perform this cleaning task, with the requirement of only one human operator for supervision purposes, who simply needs to handle the giblets that do not reach a satisfactory level of quality, after passing through the apparatus cleaning device. Thus, the human operator selects the giblets that need to undergo the cleaning process again, repositioning them in the apparatus.

Examples of apparatus developed for this purpose are presented by the Brazilian patent documents BR202015018345-9, BR202016020834-9, and BR202017012153-0, all owned by the same applicant of the invention disclosed in the present document. The abovementioned documents present specific improvements in the apparatus and devices used for cleaning giblets.

Nevertheless, despite visible improvements in the automation of the giblets cleaning processes, the applicant, continuing his studies in the field, envisioned the possibility of developing a cleaning system that could achieve greater efficiency in the removal of giblets residues, once the state-of-the-art technologies allow only a very direct displacement of the giblets that pass through the device designed to perform the removal of the residues from the giblets.

Thus, frequently, the giblets end up not receiving proper cleaning the first time they are subjected to the cleaning device, and it is necessary to process the giblets once more in the cleaning device, impairing the productivity.

In order to solve this inconvenience of the state of the art, the present invention discloses a system for cleaning poultry giblets, wherein giblets directing flows are provided during their cleaning, in such a manner that the movement of the giblets in the cleaning assembly of the system occurs in a more intensive way, providing, thereof, a better cleaning of the giblets and avoiding the need to pass the giblets in the cleaning assembly again.

Thus, it is an object of the present invention to provide a system for cleaning poultry giblets, in which a first directing flow of giblets, that occurs over the cleaning assembly, results in a back and forth movement of giblets, while a second directing flow of giblets, generated by the rotation of a giblet guiding station, works to move the giblets in the exit direction of the cleaning assembly, at the same time as it presses these giblets against the cleaning assembly, simultaneously resulting in a rotational displacement of the giblets.

Advantageously, the invention here disclosed presents a system for cleaning poultry giblets, exhibiting a more effective and efficient design, resulting in gains of productivity, increasing the final quality of the products, and making the process of cleaning more reliable and standardized, without the need of frequent human intervention. In addition, it makes its operation and maintenance more practical.

Schematic drawings of a particular embodiment of the invention can herein be seen. The dimensions and proportions presented in these schemes are not necessarily the real ones, once the drawings are only intended to didactically present its various aspects. The scope of protection is determined only by the scope of this document claims.

DESCRIPTION OF THE INVENTION

Figure 1:
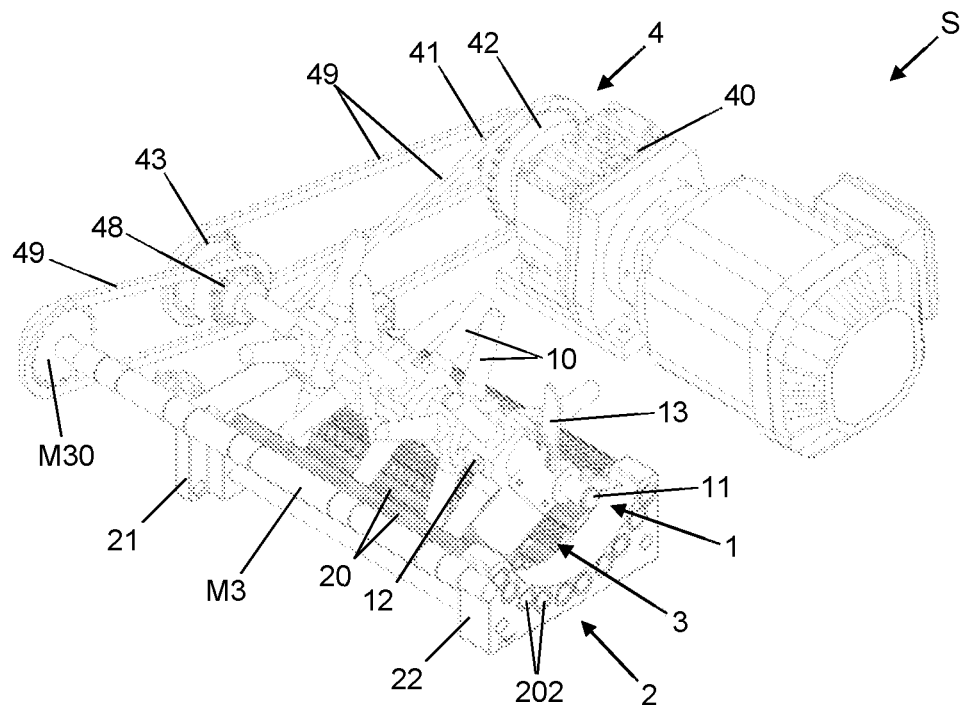
FIG. 1 shows a perspective view illustrating the system S.

As illustrated in the drawings, the system S for peeling poultry giblets (not shown) is provided on an apparatus M for processing giblets from slaughtered birds. This system S aims to promote the cleaning of such giblets. Preferably, the system S is used for cleaning gizzards, but it can also be used for the cleaning other types of giblets, such as, but not limited to, hearts.

Figure 6:
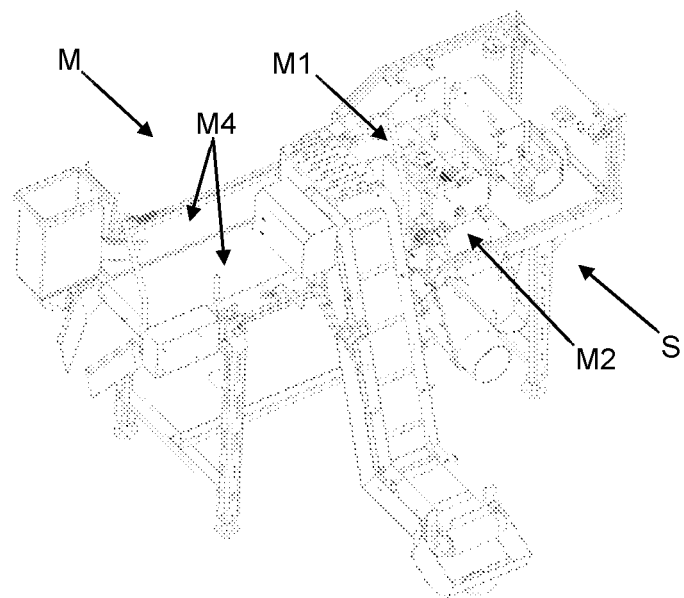
FIG. 6 shows in a perspective view, an example of an apparatus M configuration utilizing system S.

In the view according to FIG. 6, the system S is placed between a giblet input region M1 and a giblet output region M2 of the apparatus M. The giblets (not shown) go through the apparatus M to receive different types of processing, according to the specific characteristics of the referred apparatus M.

Figure 2:
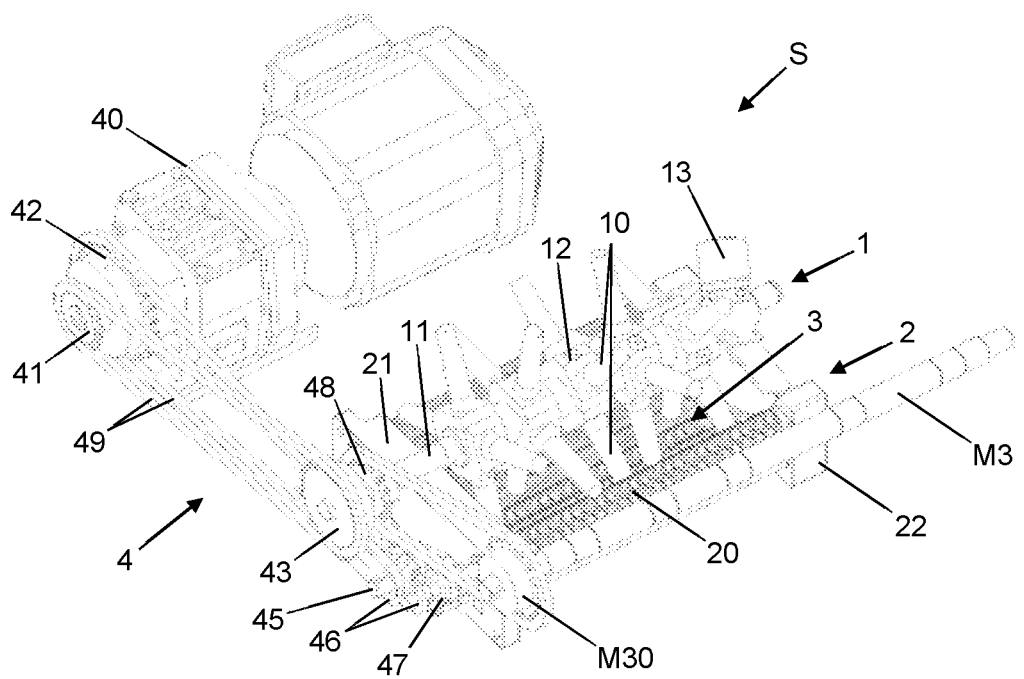
FIG. 2 shows a perspective view illustrating the system S.
Figure 3:
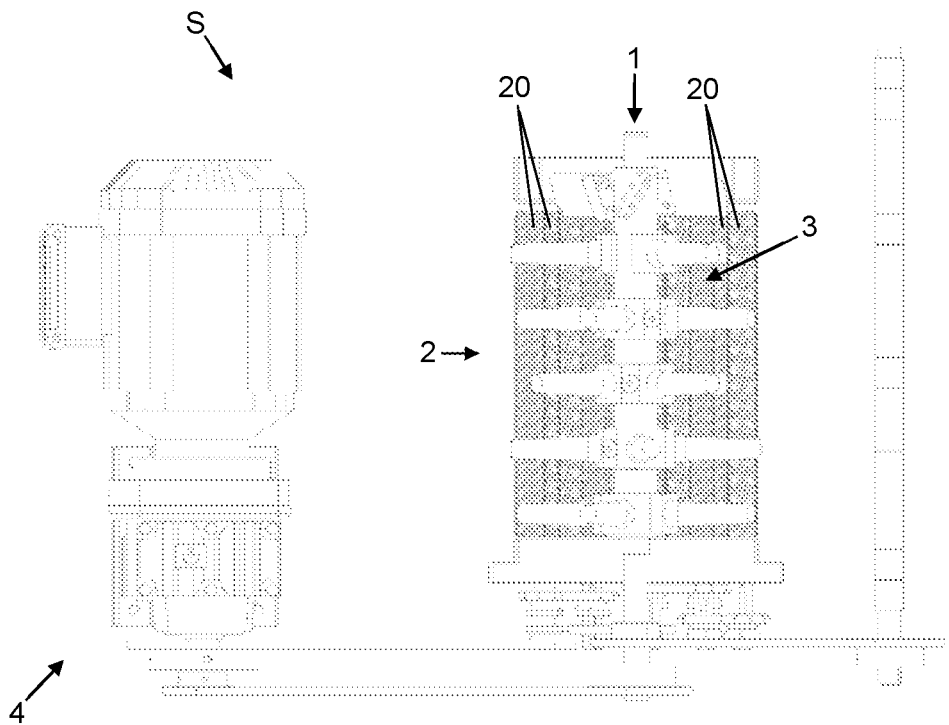
FIG. 3 shows a top view of the system S, emphasizing the direction of the second directing flow F2.
Figure 4:
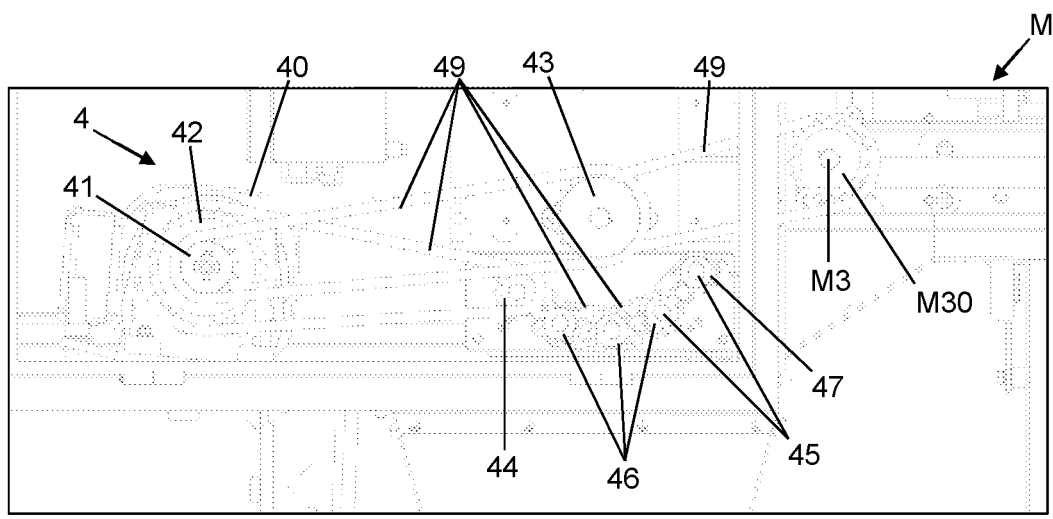
FIG. 4 shows an enlarged partial schematic front view of the apparatus M, emphasizing the drive assembly 4.

As can be seen in FIGS. 1 to 3, the system S comprises a guiding station 1 where the giblets (not shown) are moved against a cleaning assembly 2, in a manner that the guiding station 1 constantly agitates and presses the giblets (not shown) against the cleaning assembly 2. The movements performed by the cleaning assembly 2 are responsible for removing the giblets residual matter (not shown) that travels the system S. Both, the guiding station 1 and the cleaning assembly 2, are simultaneously driven by a drive assembly 4.

The abovementioned system S comprises a first directing flow F1 of giblets moving in opposite directions among each other, on a guiding region 3, wherein the first directing flow F1 is defined by the positioning of cleaning and guiding elements 20 of the cleaning assembly 2.

Thus, the guiding region 3 acts as a cradle for the giblets (not shown) that are dumped in the cleaning assembly 2 from the input region M1. The first directing flow F1 of the giblets (not shown) occurs due to the movement of the cleaning and guiding elements 20 of the cleaning assembly 2, responsible, thereof, to direct the giblets (not shown) back and forth, as they pass through the cleaning assembly 2.

This back and forth motion of the giblets (not shown) results in a better cleaning of themselves, as it makes the giblets (not show) remain for a longer period of time on the cleaning assembly 2. In addition, it forces a more intense movement of the giblets (not shown), allowing the cleaning assembly 2 to remove residual parts present in different places of each giblet's body (not shown).

Furthermore, the first directing flow F1 cooperates with a second directing flow F2 acting from the input region M1 to the giblet output region M2. This second directing flow F2 tends to push the giblets (not shown) always forward, towards the output region M2, while the first directing flow F1 directs the giblets (not show) back and forth.

Therefore, the first directing flow F1 of giblets (not shown) is provided by movement of the cleaning and guiding elements 20 relative to one other, while the second directing flow F2 of giblets (not shown) is provided by movement of a plurality of pressing elements 10 installed along and around a rotating shaft 11 of the guiding station 1.

Figure 5:
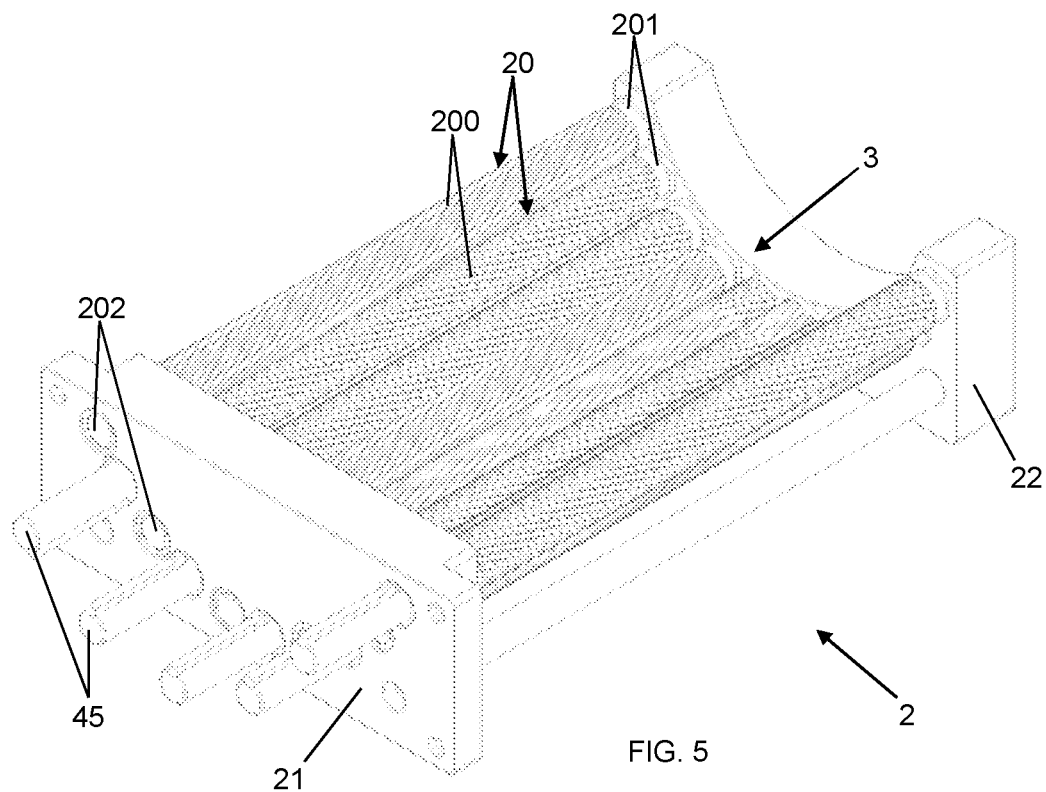
FIG. 5 shows a perspective view illustrating the cleaning assembly 2, emphasizing the direction of the first directing flow F1.

As can be seen in FIG. 5, the cleaning assembly 2 comprises an inlet support 21 and an outlet support 22 that support the edges 202 of each cleaning and guiding elements 20. Thus, the cleaning and guiding elements 20 are arranged to form a giblet accommodation cradle, which defines the guiding region 3.

Preferably, this guiding region 3 is designed as an arc shape, in such a way that while the giblets (not shown) move to the edges of this arc, they are also forced to return to the bottom of the region, by the action of gravity, preventing the giblets (not shown) from fall over the sides of the cleaning assembly 2.

Also, as illustrated in FIG. 5, each cleaning and guiding elements 20 comprises guiding elements 200, such as guiding protrusions, distributed along its entire contact surface 201 with the giblets (not shown), and such guiding elements 200 are responsible for defining the first directing flow F1 of the giblets (not shown) together with movement of the cleaning and guiding elements 20 relative to one other.

In a preferable way, as illustrated by the drawings, the cleaning assembly 2 comprises cleaning and guiding elements 20 set in groups, wherein directions of the respective guiding elements 200 are pointed towards opposite sides regarding the next group. Thus, each group of cleaning and guiding elements 20 works in opposite direction to an adjacent group of cleaning and guiding elements 20 (see FIG. 5).

Hence, the relative movement of one group of cleaning and guiding elements 20 directs the giblets (not shown) to one side, while the adjacent group of cleaning and guiding elements 20 directs the giblets (not shown) to the opposite side, resulting in the back and forth effect created by the first directing flow F1.

As a result, the giblets (not shown) certainly move about different groups of the cleaning and guiding elements 20, being, therefore, directed back and forth along the cleaning assembly 2.

As an example, in one possible embodiment of this invention, each group of cleaning and guiding elements 20 is composed of two cleaning and guiding elements 20, wherein the guiding elements 200 are arranged diagonally along the contact surface 201 of each cleaning and guiding elements 20.

Thus, these guiding elements 200 of each cleaning and guiding elements 20 are positioned in directions concurrent with directions of the guiding elements 200 of other cleaning and guiding elements 20 belonging to a same group of cleaning and guiding elements 20, forming, this way, arrows that point one way or the other.

Nevertheless, it can be understood that other forms of guiding elements 200 may be implemented, provided that they act to direct each group of cleaning and guiding elements 20 to opposite sides in an alternate manner.

Furthermore, it can be understood that the number of cleaning and guiding elements 20 of each group of cleaning and guiding elements 20 may also vary, depending on the characteristics of the giblets (not shown), the shapes of the guiding elements 200 and also from the dimensions of the cleaning and guiding elements 20.

Preferably, each pressing element 10 is designed as a frustoconical body with low flexibility and smooth surface. Such conformation allows these pressing elements 10 to push the giblets (not shown) against the cleaning and guiding elements 20 with greater efficiency.

Additionally, and preferably, the guiding station 1 comprises supports 12 installed along the rotating shaft 11. Each support 12 supports the plurality of pressing elements 10 around the rotating shaft 11 in positions displaced with respect to the pressing elements 10 supported by each adjacent support 12. Furthermore, the guiding station 1 comprises giblet outlet guiding propellers 13 from the guiding region 3 to the giblet output region M2.

As can be seen in FIGS. 1 to 4, preferably, the drive assembly 4 comprises a gearmotor 40 for moving a first drive gear 41 and a second drive gear 42, both coaxial with one other and directly connected to the gearmotor 40.

The abovementioned first drive gear 41 transmits rotation to a first driven gear 43 installed on the rotating shaft 11, causing movement in the guiding station 1, while the second drive gear 42 transmits rotation to a first gear 44 installed on a shaft 45 of one of the cleaning and guiding elements 20, for the movement of the cleaning assembly 2.

In addition, to promote the movement of other cleaning and guiding elements 20, the first gear 44 transmits rotation to another gear 46 installed on a shaft 45 of another cleaning and guiding elements 20. Another gear 46 transmits rotation to another subsequent gear 46 until a last gear 46 is reached, and the last gear transmits rotation to a peripheral gear 47.

Therefore, each cleaning and guiding elements 20, intended to move in the cleaning assembly 2, is moved by a gear 44, 46 or 47 installed on a shaft 45 of these moving cleaning and guiding elements 20. Thus, the gears 44, 46 and 47 transmit rotation to each other, from the first gear 44 to the intermediate gears 46 and, finally, to the peripheral gear 47, positioned on the last moving cleaning and guiding elements 20.

Still, preferably, the drive assembly 4 comprises a second gear 48 installed on the rotating shaft 11 that transmits rotation to a gear M30 of a shaft M3 responsible for moving conveyor belts M4 of the apparatus M. Thus, a single drive assembly 4, equipped with a single gearmotor 40, can move the entire system S and the conveyor belts M4 of the apparatus M.

Finally, preferably, each rotation transmission between two of the gears 41, 42, 43, 44, 46, 47, 48, i.e., the transmission between each pair of gears, is carried out by one of the chains 49.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures. While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A system for cleaning poultry giblets, the system being placed between a poultry giblet input region and a poultry giblet output region of an apparatus for cleaning the poultry giblets, wherein the system comprises a guiding station of giblets set against a cleaning assembly, both moved by a drive assembly, the system further comprising:
   a first directing flow of giblets operated to move the giblets back and forth across a guiding region defined by the positioning of cleaning and guiding elements of the cleaning assembly, wherein
      the first directing flow is provided by movement of the cleaning and guiding elements relative to one other and the first directing flow cooperates with a second directing flow of giblets being operated over the cleaning assembly, the second directing flow being provided by movement of a plurality of pressing elements installed along and around a rotating shaft of the guiding station, wherein
      the second directing flow is operated to move the giblets from the giblet input region to the giblet output region.

2. The system according to claim 1, wherein the cleaning assembly comprises:
   an inlet support and an outlet support that support the edges of each cleaning and guiding element, wherein each cleaning and guiding element comprises guiding elements, distributed along an entire contact surface of each cleaning and guiding element.

3. The system according to claim 2, wherein the cleaning assembly comprises:
   the cleaning and guiding elements set in groups, wherein directions of the respective guiding elements are pointed in opposite directions to each other, and wherein
      each group of cleaning and guiding elements works in an opposite direction to an adjacent group of cleaning and guiding elements.

4. The system according to claim 3, wherein each group of cleaning and guiding elements comprises:
   two cleaning and guiding elements with the guiding elements arranged diagonally along the contact surface of each cleaning and guiding element, wherein
      the guiding elements of each cleaning and guiding element are positioned in directions concurrent with directions of the guiding elements of other cleaning and guiding elements belonging to a same group of cleaning and guiding elements.

5. The system according to claim 2, wherein the guiding elements comprise guiding protrusions.

6. The system according to claim 1, wherein each pressing element comprises a flexible and smooth-surfaced frusto-conical body.

7. The system according to claim 1, wherein the guiding station comprises:
   supports installed along the rotating shaft and each support is used to support the plurality of pressing elements around the rotating shaft in positions displaced from positions of the pressing elements supported by each adjacent support, wherein the guiding station comprises:
      giblet outlet guiding propellers that move the giblets from the guiding region to the giblet output region.

8. The system according to claim 1, wherein the drive assembly comprises:
   a geared motor for moving a first drive gear and a second drive gear, both coaxial with one other, wherein
      the first drive gear transmits rotation to a first driven gear installed on the rotating shaft;
      the second drive gear transmits rotation to a first gear installed on a shaft of one of the cleaning and guiding elements;
   wherein the first gear transmits rotation to another gear installed on a shaft of a second one of the cleaning and guiding elements; and
      the another gear transmits rotation to another subsequent gear until a last gear is reached, and the last gear transmits rotation to a peripheral gear.

9. The system according to claim 8, wherein the drive assembly comprises:
   a second gear installed on the rotating shaft that transmits rotation to a gear of a shaft for moving conveyor belts of the apparatus.

10. The system according to claim 8, wherein each rotation transmission between each pair of gears that are connected one to another is provided by a chain.

* * * * *